(12) United States Patent
Dos Santos Pereira et al.

(10) Patent No.: US 12,498,320 B2
(45) Date of Patent: Dec. 16, 2025

(54) METHOD FOR MONITORING THE PRECIPITATION OF INORGANIC SALTS IN AQUEOUS SYSTEMS

(71) Applicants: PETRÓLEO BRASILEIRO S.A.—PETROBRAS, Rio de Janeiro (BR); UNIVERSIDADE TIRADENTES—UNIT, Aracaju (BR); INSTITUTO DE TECNOLOGIA E PESQUISA—ITP, Aracaju (BR)

(72) Inventors: Leonardo Dos Santos Pereira, Rio de Janeiro (BR); Fabiane Santos Serpa, Aracaju (BR); Bruno Barbosa Castro, Rio de Janeiro (BR); Jailton Ferreira Do Nascimento, Rio de Janeiro (BR); Gabriela Menezes Silva, Aracaju (BR); Eloisa Borges E Borges, Aracaju (BR); Gustavo Rodrigues Borges, Aracaju (BR); Claudio Dariva, Aracaju (BR); Elton Franceschi, Aracaju (BR); Elvio Barreto De Melo Filho, Aracaju (BR)

(73) Assignees: Petróleo Brasileiro S.A.—Petrobras, Rio de Janeiro (BR); Universidade Tiradentes—UNIT, Aracaju (BR)

( * ) Notice: Subject to any disclaimer, the term of this patent is extended or adjusted under 35 U.S.C. 154(b) by 147 days.

(21) Appl. No.: 18/456,079

(22) Filed: Aug. 25, 2023

(65) Prior Publication Data
US 2024/0068938 A1    Feb. 29, 2024

(30) Foreign Application Priority Data
Aug. 25, 2022  (BR) .............. 10 2022 016964 0

(51) Int. Cl.
*G01N 21/3577*   (2014.01)
*G01N 21/359*   (2014.01)
*G01N 33/18*   (2006.01)

(52) U.S. Cl.
CPC ....... *G01N 21/3577* (2013.01); *G01N 21/359* (2013.01); *G01N 33/18* (2013.01); *G01N 2201/129* (2013.01)

(58) Field of Classification Search
CPC .. G01N 21/3577; G01N 21/359; G01N 33/18; G01N 2201/129; G01N 15/0205;
(Continued)

(56) References Cited

U.S. PATENT DOCUMENTS

2008/0227786 A1* 9/2008 Ferlita ............... C07D 487/04
514/249
2013/0139749 A1    6/2013 Betzel et al.

FOREIGN PATENT DOCUMENTS

GB    2217838 A  * 11/1989 ......... G01N 21/3577
JP    2007-077000    3/2007
WO    WO 14/093572   6/2014

OTHER PUBLICATIONS

Al Nasser et al., 2014, Kinetics determination of calcium carbonate precipitation behavior by inline techniques, Powder Technology, http://dx.doi.org/10.1016/j.powtec.2014.05.025, 13 pp.
(Continued)

*Primary Examiner* — Kiho Kim
(74) *Attorney, Agent, or Firm* — Knobbe, Martens, Olson & Bear, LLP

(57) ABSTRACT

Systems and methods of the present disclosure relate to a method for online monitoring, without the need for sampling and in real time, the precipitation of inorganic salts in aqueous streams related to the petroleum industry. A set of collected NIR spectra is correlated with data provided by FBRM through a mathematical (chemometric) treatment
(Continued)

and mathematical models based on artificial neural networks combined with principal component analysis were employed to estimate the quantity and size distribution of particles precipitated over time. The application of these process analyzers helps to understand the formation and growth of inorganic salt particles from the produced water (rich in carbonates and sulfates), which can precipitate at different stages in oil production and transportation facilities.

7 Claims, 7 Drawing Sheets

(58) Field of Classification Search
CPC ......... G01N 15/075; G01N 2015/0053; G01N 2015/0092; G01N 15/04; G01N 1/28; G01N 33/00; G01N 17/008; C09K 8/528; E21B 47/006
See application file for complete search history.

(56) References Cited

OTHER PUBLICATIONS

Bai et al., 2010, Hydrates, in Subsea Engineering Handbook, Elsevier, Amesterdam, p. 451-481.
Flaten et al.. 2015, Impact of monoethylene glycol and $Fe^{2+}$ on crystal growth of CaCO3. NACE International, Corrosion 2015 Conference & Expo, Paper No. 5770, 15 pp.
Khormali et al. 2018, Increasing efficiency of calcium sulfate scale prevention using a new mixture of phosphonate scale inhibitors during waterflooding, Journal of Petroleum Science and Engineering, 164:245-258.
Liu et al., May 2011, Monitoring of antisolvent crystallization of sodium scutellarein by combined FBRM-PVM-NIR. Journal of Pharmaceutical Sciences, 100(6):2452-2459.
Martos et al., 2010, Effect of precipitation procedure and detection technique on particle size distribution of CaCO3. Journal of Crystal Growth, 312:2756-2763.
Mpelwa et al., 2019, State of the art of synthetic threshold scale inhibitors for mineral scaling in the petroleum industry: a review, Petroleum Science, 16:830-849.
Ohen et al., Nov. 2004, Assessment and Diagnosis of Inorganic-Scaling Potential Using Near-Infrared Technology for Effective Treatment, SPC Production & Facilities, pp. 245-252.
Risthaus et al., 2001, Barite scale formation and dissolution at high ionic strength studied with atomic force microscopy, Colloids and Surfaces A: Physicochemical and Engineering Aspects, 191(3):201-214.
Serpa et al., 2022, An experimental study of calcium carbonate precipitation with hydrate inhibitor in MEG recovery unit, Upstream Oil and Gas Technology, 8:100061.
Sorbie et al., 2004, How scale inhibitors work: Mechanisms of selected barium sulphate scale inhibitors across a wide temperature range, SPE Sixth International Symposium on Oilfield Scale, SPE 87470, pp. 447-456.
Venancio et al., 2018, Use of a dynamic system and reflectance measurements to assess the impact of monoethylene glycol on calcium carbonate scale, Journal of Petroleum Science and Engineering, 165:581-585.
Wang et al., 2018, Laboratory study on efficiency of three calcium carbonate scale inhibitors in the presence of EOR chemicals. Petroleum, 4(4):375-384.

* cited by examiner

METHOD FOR MONITORING THE PRECIPITATION OF INORGANIC SALTS IN AQUEOUS SYSTEMS

FIELD OF THE INVENTION

The present invention is part of the field of Exploration and Production of Oil and Gas, and refers to a method for online monitoring, without the need for sampling and in real time, of the inorganic salts precipitation in aqueous streams related to industrial processes, specifically the oil industry, based on near-infrared spectroscopy (NIR) and can be applied directly to lines and pipelines through which the aqueous solution flows. Furthermore, information about the initial stages of precipitation is obtained from the moment in which a variation occurs in the absorbances of the spectra, which is due to the formation of solid particles in the solution. The NIR information was correlated with the data provided by the auxiliary FBRM technique (Focused Beam Reflectance Measurement), which provides subsidies regarding the distribution of the quantity and size of nucleated and precipitated particles, which are monitored in suspension and in real time.

The use of the proposed method seeks to contribute to the improvement and optimization of industrial process parameters through the prevention and/or control of the phenomena involved in the precipitation and deposition of salts commonly found in exploration and production systems, during the flow of multiphase fluids (water, oil and natural gas). The impact of temperature, pressure and ion concentration in the aqueous medium on the formation of inorganic scale is a challenge for the oil industry. Monitoring the growth process of these crystals is of fundamental importance, in order to avoid operating conditions favorable to the precipitation and scale of inorganic salts from the production water.

BACKGROUND OF THE INVENTION

Oil exploration and production operations pose challenges due to the production and transport of multiphase fluids (water, oil and natural gas) in regions with severe temperature and pressure conditions, high levels of carbon dioxide (CO 2) and high salinity, typical of reservoirs found in deep water. This scenario favors the precipitation of low solubility inorganic salts in the environment in which they are found and their deposition in the reservoir, on the equipment surfaces and in the flow system for the produced oil. In addition, the gas to be transported will be subject to low temperatures and high pressures, which favor the formation of hydrates due to the contact between water and light hydrocarbons present in the fluid composition.

The search for greater efficiency in the oil production in offshore fields sometimes uses seawater as an injection fluid in the reservoirs (RISTHAUS et al. Barite scale formation and dissolution at high ionic strength studied with atomic force microscopy. Colloids and Surfaces A: Physicochemical and Engineering Aspects, 191 (3), p. 201-214, 2001) or even the direct reinjection of $CO_2$, both aiming to increase the oil recovery factor in offshore fields. However, changes in temperature and pressure of aqueous systems with large amounts of $CO_2$ dissolved, change the concentration of this compound in the medium (MARTOS et al. Effect of precipitation procedure and detection technique on particle size distribution of CaCO3. Journal of Crystal Growth, 312, p. 2756-2763, 2010), promoting variation in the pH value of the solution (WANG et al. Laboratory study on efficiency of three calcium carbonate scale inhibitors in the presence of EOR chemicals. Petroleum, 4(4), p. 375-384, 2018), thus inducing the scale formation by carbonates. Frequently inorganic scales by sulfates are formed due to the chemical incompatibility between the formation and injection water compositions (KHORMALI et al. Increasing efficiency of calcium sulfate scale prevention using a new mixture of phosphonate scale inhibitors during waterflooding. Journal of Petroleum Science and Engineering, 164, p. 245-258, 2018).

Minimizing problems found during these operations such as the formation of hydrates and inorganic scale is essential to guarantee the operational continuity of the processes. Thus, to avoid and/or remedy the formation of hydrates, numerous procedures have been developed by the oil industry. The injection of hydrate formation inhibitors has been a practice that seeks to solve or reduce this problem (BAI, Y. BAI, Q. Hydrates, Subsea Engineering Handbook, p. 451-481, 2010). However, undesirable effects have been observed since the presence of these compounds favors the precipitation of salts present in the formation water (VENANCIO et al. Use of a dynamic system and reflectance measurements to assess the impact of monoethylene glycol on calcium carbonate scale. Journal of Petroleum Science and Engineering, 165, p. 581-585, 2018).

For example, monoethylene glycol (MEG) acts as a thermodynamic inhibitor of hydrates, but reduces the solubility of salts from production water (FLATEN et al. Impact of monoethylene glycol and Fe2+ on crystal growth of CaCO3. NACE International, Publications Division, 2015). These events need to be monitored during the MEG treatment process to guarantee the operational reliability of the unit. Salts tend to precipitate at different points in the process (separators and heat exchangers, vacuum recovery system, distillation column) causing scales that, over time, can lead to total obstruction of the lines and equipment. Along with the economic aspects, environmental aspects reinforce the need for monitoring and controlling this process. The environmental legislation establishes compliance with criteria concerning the maximum admissible levels of contaminants in the MEG such as salts, chemical additives and oil content aimed at the reinjection or disposal of these effluents. The search for promising technologies is considered a point of particular interest for the oil industry.

Another strategy adopted by the industry in the search for greater efficiency in oil production is to use scale forming chemical inhibitors (MPELWA, M.; TANG, S. F. *State of the art of synthetic threshold scale inhibitors for mineral scaling in the petroleum industry: a review. Petroleum Science*, 16, p. 830-849, 2019). These inhibitors are substances with the function of inhibiting or delaying the precipitation and accumulation of inorganic material. Scale inhibitors act on different mechanisms of salt precipitation, inhibiting the nucleation stages and/or crystal growth, which results in the redissolution or modification and retardation of the nucleated crystal growth (SORBIE, K. S.; LAING, N. *How scale inhibitors work: Mechanisms of selected barium sulphate scale inhibitors across a wide temperature range. SPE Sixth International Symposium on Oilfield Scale*, p. 447-456, 2004), thus interfering in the precipitate formation process. From an operational point of view, there are different strategies for applying scale inhibitors. Inhibitors can be added at different stages of the process (production zones, production lines, subsurface and surface equipment), in which supersaturated waters are susceptible to the formation of precipitates and scales.

Monitoring the precipitation of salts in aqueous solutions allows investigating the mechanisms of nucleation and growth kinetics of salt crystals, in order to avoid the effects associated with the formation of inorganic deposits, as well as corrosion points in the production system lines and equipment and transportation of oil and gas. The method developed by this patent consists of using the NIR technique to monitor the size distribution evolution of the precipitated particles over time in aqueous systems in the presence of different solvents, pH conditions, supersaturation, temperature and pressure.

NIR is a spectroscopic method which radiation absorption is typically in the region of the electromagnetic spectrum and covers the range of 700 and 2500 nm of wavelength (LIU et al. Monitoring of antisolvent crystallization of sodium scutellarein by combined FBRM-PVM-NIR. Journal of Pharmaceutical Sciences, 100, p. 2452-2459, 2011). Spectral analysis in the NIR region is performed using a module coupled to an optical fiber probe through which a laser beam passes, which is projected onto the sample. The intensity of the absorbed light as a function of wavelength is measured before and after interacting with the medium (OHEN et al. Assessment and Diagnosis of Inorganic-Scaling Potential Using Near-Infrared Technology for Effective Treatment. SPE—International Symposium and Exhibition on Formation Damage Control, p. 245-252, 2004).

NIR spectroscopy is based on the combination of molecular binding vibrations (transformation of absorbed radiation energy into vibrational and rotational energy). Different molecules will absorb energy at different frequencies depending on the characteristics of their bonds. The initial instants of precipitation of carbonate salts were identified from the variation in the spectra absorbances related to the formation of solid particles in the solution (OHEN et al., 2004). This variation occurs mainly as a function of the spectrum baseline offset.

Additionally, the FBRM technique was used as an auxiliary reference technique for calibrating data from the NIR tool. The FBRM is an equipment that allows real-time analysis of the size and quantity of particles present in the aqueous system. It consists of a near-infrared laser beam focused on the suspension, which is projected through the probe window with a fixed speed. When the laser reaches a crystal, the light is reflected back to the probe, the software analyzes the signal and the reflection time is accounted for providing a string length distribution, in the count versus string length form.

Data from NIR (spectra) were initially treated using a chemometric model based in the Principal Component Analysis (PCA) wherein the principal sources of variations in the aqueous system are obtained. The PCA is a statistical multivariate analysis tool that reorganizes a set of n variables in a new set with a smaller number of uncorrelated variables (principal components) containing the most relevant information from the original set. The principal components along with the experimental observation time provided by the FBRM technique consist of input data for the construction of kinetic models of formation and growth of salts in solvent mixtures based on neural networks. The architecture of the neural model is of the feedforward back propagation type with the Bayesian regularization training algorithm.

Thus, it is emphasized that the present patent of invention aims to disclose a methodology based on the use of real-time monitoring techniques that can be applied in different stages of the precipitation process in order to identify and monitor the presence of inorganic compounds, preferably inorganic salts based on the variation of absorbance spectra provided by the NIR technique, and correlate with the monitoring of the distribution of quantity and size of precipitated particles. In addition, models were built to estimate the amount and size distribution of precipitated particles over time. Such information is extremely important when trying to clarify the phenomenon of precipitation that may occur in the system due to the presence of salts from the production water.

STATE OF THE ART

Some documents present in the state of the art propose the use of real-time monitoring techniques in order to investigate the crystallization process of different compound arrays, for example:

Document JP2007077000 presents a method for monitoring the crystallization process of compounds using the NIR spectroscopy technique. The method consists of promoting precipitation by varying the temperature of the system and monitoring the change in absorbance of each functional group that makes up the molecular structure of the compound. However, the present invention differs from the aforementioned document as it discloses a methodology based on the use of the NIR technique which, in addition to identifying the presence of inorganic compounds in aqueous solution, also provides the number and size of particles precipitated in the system, a fact of great relevance. Furthermore, models based on artificial neural networks are obtained to estimate the amount and size distribution of the precipitated particles over time.

Document US2013139749 describes a device and a method for monitoring the growth of crystals of biological material (protein) by simultaneously employing the dynamic light scattering (DLS) technique that determines the radius size distribution of protein molecules and the light microscopy technique for measuring and monitoring the crystal growth kinetics. The DLS technique is used to measure the size distribution of particles that are suspended in a liquid medium in offline mode, not allowing the monitoring of the precipitation process in real time and dynamically, as required in this invention. Furthermore, this technique provides a particle hydrodynamic diameter restricting the analysis to particulates with spherical morphology. Thus, the technique is limited for the proposed application, since crystals of salts precipitated in the presence of solvents have different morphologies, which directly influence the kinetic process of growth. The methodology disclosed in said document differs from the present invention, as it presents a methodology that allows the real-time monitoring (inline) of particles regardless of morphology. In this context, document US2013139749 is not characterized as limiting the state of the art for the present invention.

Document WO2014/093572 discloses optical systems and methods for real-time detection and monitoring the composition and concentration of various constituents present in well drilling fluids. Despite referencing and reporting a method for monitoring the formation of inorganic particulates, said document is substantially different from what is required in the present invention, as it does not disclose in detail the monitoring of the kinetics of these solids' growth over time, in solvent mixtures and different operational process conditions such as temperature, pressure and composition of the solution. The present invention concerns the development of a procedure that allows the continuous monitoring of the inorganic salts' precipitation in aqueous streams, considering the different operating conditions of the aforementioned process. The proposed mathematical model helps to describe the behavior of these experimentally investigated phenomena. In addition, the simultaneous use of more than one technique for monitoring the salt precipitation process ensures the quality of the information obtained about the system, thus allowing the continuous improvement of the process. Thus, the mathematical model provides an increase in the reliability of the procedures performed, thus increasing the efficiency of the process.

In work published by A1 Nasser et al., entitled *Kinetics determination of calcium carbonate precipitation behavior by inline techniques*, the authors reported a study on the period of induction and growth kinetics of $CaCO_3$ employing FBRM monitoring techniques and a technique that allows the particle vision and measurement (PVM). Analyzes were conducted in a closed system (batch mode) with temperature control of the precipitation reaction. The present invention refers to the combination of information in real time through the coupling of FBRM and NIR techniques for monitoring the kinetics of salt precipitation and differs from the literature above mentioned, since the PVM microscopy technique provides only the visualization and measurement of the particle size online. In addition, the techniques presented in the scientific work have the disadvantage of the minimum Limit of Detection in Crystals present in the solution. The image only shows clear particle resolution for sizes above 2 □m, which is a limitation when one intends to investigate phenomena such as nucleation. Thus, the proposed invention uses the NIR technique that detects the instant of the particle formation (induction time) on a smaller scale (nanometers). This allows greater control of the dynamic mechanisms of the process. Additionally, the NIR technique allows the use of great extension optical fibers, which allows the monitoring of the precipitation kinetics in several points of the flow lines.

The scientific work proposed by LIU et al., entitled *Monitoring of antisolvent crystallization of sodium scutellarein by combined FBRM-PVM-NIR*, uses the combination of FBRM, PVM and NIR techniques to investigate the crystallization process of an organic compound (flavonoid). The NIR technique was used to determine the compound concentration present in the mixture. Furthermore, the tests were carried out in batch mode and without controlling parameters such as temperature. The present invention reveals another important application of the NIR technique, in which one seeks to monitor the evolution process of the quantity distribution and size of the precipitated inorganic salt particles in aqueous systems. The use of the NIR technique for the analysis of organic compounds is commonplace in the literature, since the atoms and molecules vibrations of such components is quite pronounced in this region of the spectrum. However, its extension to inorganic systems is neither direct nor trivial, requiring analysis and propositions such as the one presented in the present invention. The approach given to the technique is related to obtaining information about the formation stage (induction time), as well as monitoring the growth kinetics of precipitated crystals over time. A mathematical model that allows obtaining the amount and size of salt crystals present in solvent mixtures can be obtained in different solvent concentrations, saline concentrations and with temperature control of the system to be investigated. Thus, said document does not present facts that can be understood as limiting the scope of the present invention.

The scientific work published by Ohen et al., evaluated the efficiency of chemical salt scale inhibitors in different saline solutions (rich in carbonates and sulfates), temperatures (75 to 160° C.) and salt concentrations using the NIR spectroscopy technique. The methodology adopted consists of reducing the system pressure until detection of the instant (onset) of salt precipitation observed through the variation of NIR absorbance spectra under different conditions of temperature and pressure. Said publication does not constitute a limiting factor for the present invention, since it is characterized by the simultaneous use of NIR and FBRM techniques in order to provide important parameters on the phenomena associated with nucleation, growth and agglomeration of crystals through monitoring from the size distribution and quantity of salt particles after formation detection and over time in different solvent mixtures, saline concentrations and controlled temperature. This is the key and differentiating point of the present invention: the development of a tool that enables real-time monitoring of the nucleation kinetics, precipitation and inorganic crystals growth. It is also noteworthy that through the proposed mathematical model it is possible to describe the behavior of these phenomena investigated experimentally. The use of more than one technique for monitoring the salt precipitation process ensures the quality of the information obtained about the system, thus allowing the continuous improvement of the process.

The scientific document proposed by SERPA et al., entitled *An experimental study of calcium carbonate precipitation with hydrate inhibitor in MEG recovery unit*, aims to evaluate the precipitation of $CaCO_3$ in water+MEG mixtures (0-50 vol. % MEG) at different concentrations of reagent salts (0.01-0.1 mol $L^{-1}$) and temperatures (25-60° C.). The focused beam reflectance measurement (FBRM) technique was used for in-line monitoring of string length and $CaCO_3$ particle distribution in suspension for 60 minutes. Optical microscopy was used to understand the particle precipitation phenomena. The FBRM results show that the size distribution and the number of $CaCO_3$ particles in aqueous solution vary with time, temperature, reagent salts and MEG concentrations. The higher the salt concentration, the greater the size and the number of precipitated strings. Temperature significantly affects the salt precipitation. For a given concentration of MEG, the increase in temperature favors an increase in the quantity and size of the strings. Specifically, for 10% v/v MEG solutions, the particle size increases from 8.0±0.5 µm (at 25° C.) to 20.4±2.1 µm (at 60° C.). Furthermore, at 30% v/v MEG in solution, the particle size increases from 5.4±0.4 µm (at 25° C.) to 15.5±0.2 µm (at 60° C.). These results are related to the reduction of $CaCO_3$ solubility and the improvement of MEG viscosity with temperature. Optical microscopy measurements corroborate the FBRM data, thus demonstrating the influence of the MEG concentration parameters, ionic concentration and temperature on the number and size of the precipitated carbonate crystals. The methodology revealed in detail in this document proposes the use of the FBRM technique to monitor the size distribution and quantity of precipitated particles over time as a function of temperature and ionic concentration. The FBRM technique does not clearly reveal particle resolution to nanometric sizes, which is a limitation when one intends to investigate phenomena such as nucleation. The present invention refers to the use of the FBRM technique as an instrument for calibrating the NIR tool, the latter being the principal tool for monitoring the kinetics of salt precipitation and differing from the aforementioned literature, since the addition of the NIR technique allows the detection of the particle formation instant (induction time) on a smaller scale (nanometers), providing greater control of the dynamic mechanisms of the process. In addition to monitoring the process, a mathematical model can be used to build kinetic models of precipitation and growth of salt crystals in aqueous solutions and to describe the behavior of these phenomena investigated experimentally over time.

Thus, unlike the state of the art, the present invention enables the combination of different techniques (NIR and FBRM) capable of monitoring and describing the phenomena related to different stages of the formation kinetics and growth of inorganic salts particles over time, in solvent mixtures and different process operating conditions such as temperature, pressure and solution composition.

SUMMARY OF THE INVENTION

The present invention aims to propose a method for online monitoring, without the need for sampling and in real time, the precipitation of inorganic salts in aqueous systems related to the oil industry. Said method is based on the use of the NIR technique, which makes it possible to collect spectra and monitor the variation in absorbances, concerning the solid particles formation in the solution. Additionally, the FBRM technique was used as a reference technique for data calibration. Thus, a set of collected NIR spectra was correlated with the data provided by FBRM through a mathematical treatment (chemometric) and models based on artificial neural networks are obtained to estimate the quantity and size distribution of precipitated particles over time. The application of these process analyzers helps in understanding the formation and growth of the inorganic salt particles from mixtures of saline solutions (rich in carbonates and sulfates) with different compositions of anions and cations, in the presence of different solvents, pH conditions, temperature and pressure, which can precipitate at different stages in oil production and transportation facilities.

Monitoring and controlling the precipitation of saline compounds under different operating conditions is of fundamental importance in order to ensure specifications and avoid scales problems (reduced production flow) and corrosion points (production stoppage for maintenance) in the lines and equipment in oil exploration and production units.

BRIEF DESCRIPTION OF THE FIGURES

In order to obtain a total and complete visualization of the objective of this invention, the figure to which references are made is presented, as follows.

DETAILED DESCRIPTION OF THE INVENTION

Figure 1:
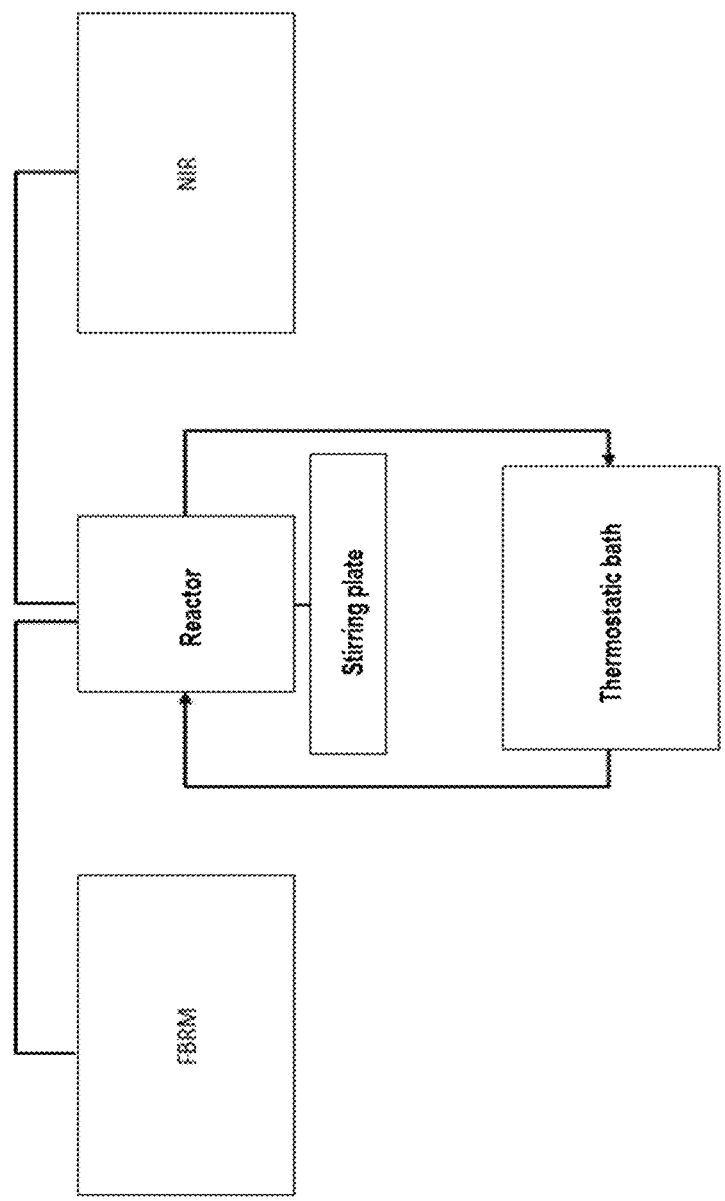
FIG. 1 presents a schematic diagram of the experimental unit for monitoring the precipitation of inorganic salts in solvent mixtures using simultaneously the NIR and FBRM techniques, where (1) represents the FBRM probe and module; (2) represents the probe and NIR module; (3) represents the magnetic stirrer; (4) represents computers for data acquisition; (5) represents the jacketed glass reactor; (6) represents the water recirculation bath for temperature control.

The present invention refers to a method for online monitoring, without the need for sampling and in real time, the precipitation of inorganic salts in aqueous systems related to the oil industry, in different types and concentrations of solvents, ionic concentrations, conditions of pH, temperature and pressure, based on the use of the NIR technique, which allows the collection of spectra and the monitoring of the absorbances variation, referring to the formation of solid particles in the solution, and the FBRM technique, which is used as a reference technique for data calibration. Thus, said method comprises the following steps:

(a) Preparing synthetic saline solutions;
(b) Monitoring the salt precipitation ($SrCO_3$ or $CaCO_3$);
(c) Obtaining the Experimental Data; and
(d) Calibrating the Mathematical Models To demonstrate the potential of said method, the present invention will be described in more detail, as an example, by monitoring the growth kinetics of carbonate salts in aqueous systems containing MEG, in different saline concentrations and at controlled temperature. However, this method is not limited to the operating conditions found in MEG treatment units, and can be applied to other processes, salt concentrations and types, solvents and different temperature and pressure conditions. The example only has the purpose of elucidating the understanding of the proposed invention and disclosing, in more detail, the embodiment of the invention without limiting it thereto. Thus, variables similar to the example are also within the scope of the invention.

(a) Preparation of the Synthetic Saline Solutions

The first stage consists of the preparation of synthetic waters (anion and cation waters) with a saline composition similar to the formation water of a Brazilian oil field. Therefore, the concentrations shown in Table 1 can be considered.

TABLE 1

Chemical composition of the synthetic saline solution used in the precipitation tests of carbonate salts.

| Cation solution | |
|---|---|
| Sodium | Concentration |
| ions ($Na_+$) | (ppm) 50,000 |
| Strontium ($Mr_{2+}$) | 4,200 |
| Calcium ($Ca_{2+}$) | 26500 |

TABLE 1-continued

Chemical composition of the synthetic saline solution used in the precipitation tests of carbonate salts.

Anion solution

| Íons | Concentration (ppm) |
|---|---|
| Carbonate ($CO_3$) | 448 |

Under these conditions, the precipitated salts ($CaCO_3$ and $SrCO_3$) are obtained from the mixture of anion and cation aqueous solutions, in different ratios of MEG solvent (0 or 40% mass) and temperature of 60° C. The reactive precipitation of $CaCO_3$ must be carried out, preferably from the dilution of calcium chloride dihydrate ($CaCl_2 \square 2H_2O$) and sodium carbonate ($Na_2CO_3$). The precipitation of $SrCO_3$ should be considered through the precipitation reaction of strontium nitrate ($Sr(NO_3)_2$) and sodium carbonate ($Na_2CO_3$) aqueous solutions. All samples are prepared gravimetrically and filtered (0.45 $\square$m nylon). In reactions involving NaCl, the same mass of NaCl, shown in Table 1, is added to both solutions (anion and cation).

(b) Monitoring the Salt Precipitation ($SrCO_3$ or $CaCO_3$)

Monitoring of $CaCO_3$ and $SrCO_3$ precipitation is conducted according to the schematic diagram of the experimental unit as shown in FIG. 1. It consists of a jacketed glass reactor with an approximate volume of 600 mL (5), coupled to a bath water recirculation ultrathermostat (6) previously adjusted to the experiment temperature (60° C.). To promote agitation of the solution and try to keep the crystals suspended in the solution, a magnetic stirrer and a magnetic bar (3) are used at a constant rotation of 1100 rpm.

The FBRM probes (model G400, Mettler Toledo) (1) and NIR (Antaris MX model, Thermo Scientific) (2) are inserted into the reactor. The FBRM probe should preferably be kept at an inclination of approximately 45° to avoid the formation of encrustation at its end, ensured by the maximum permissible error of the equipment (fouling index<10%). The measurement form obtained using the NIR probe is transflectance with an optical path of 1 mm. Computers (4) simultaneously record information about precipitated crystals using iC FBRM™ (FBRM) and TQ Analyst (NIR) software. The time in which the process is monitored is about 60 minutes.

(c) Obtaining the Experimental Data

To obtain the experimental data, approximately 250 g of the anion solution are added to the reactor and kept under agitation at a controlled temperature (60° C.). Then the NIR and FBRM probes are inserted and thus the data acquisition by the equipment starts simultaneously. The FBRM probe is used to monitor the evolution of the quantity distribution and size of precipitated salt strings in water/MEG mixtures with a data acquisition rate set to every 2 seconds. The NIR spectra are correlated with data regarding the quantity and size of crystals obtained by the FBRM technique. Information about the initial stages of precipitation is obtained from the moment in which a variation occurs in the absorbances of the NIR spectra, concerning the formation of solid particles in the solution. NIR spectra are collected in the region from 4250 to 10000 $cm^{-1}$ and each spectrum corresponds to 1 scan (scanning) with a duration of 2 seconds and a resolution of 8 $cm^{-1}$.

Subsequently, the cation solution (250 g) is added to the reactor, also at the desired temperature, starting the salt precipitation experiment. For the conditions involving the MEG solvent, the mass fraction corresponding to the condition to be studied is previously added to each solution (anion and cation) and homogenized via magnetic stirring.

(d) Calibrating the Mathematical Models

Data from NIR (spectra) and FBRM previously obtained are treated using the chemometric model based on principal component analysis where the principal sources of variations are obtained. The PCA is a statistical multivariate analysis tool that reorganizes a set of n variables in a new set with a smaller number of uncorrelated variables (principal components) containing the most relevant information from the original set.

The principal components along with the experimental observation time are considered input data for the construction of the kinetic model of salt precipitation based on neural networks. The architecture of the neural model is of the feedforward back propagation type with the Bayesian regularization training algorithm. The artificial neural network is trained using a hidden layer varying the number of neurons between 1 and 50 and using linear transfer and hyperbolic tangent functions. The entire modeling procedure is carried out with the aid of the software MATLAB® version 2015. The performance of the model fit ability was determined using the Root Mean Square Error (RMSE).

Defined by Equation (1).

$$RMSE = \sqrt{\frac{\sum_{i=1}^{n}(Y_{P,i} - Y_{R,i})^2}{n}} \quad (1)$$

(1) Where YP,i and YR,i are, respectively, the particle size or quantity values predicted by NIR and the value provided by FBRM for a set of samples (spectra) provided at the time of model fit. Of this data set, 70% was used for model calibration and 30% was used for comparison. It should be noted that other mathematical approaches and other software can be applied at this stage of the process without detracting from the innovative nature of this proposal.

Results Obtained

Figure 2:
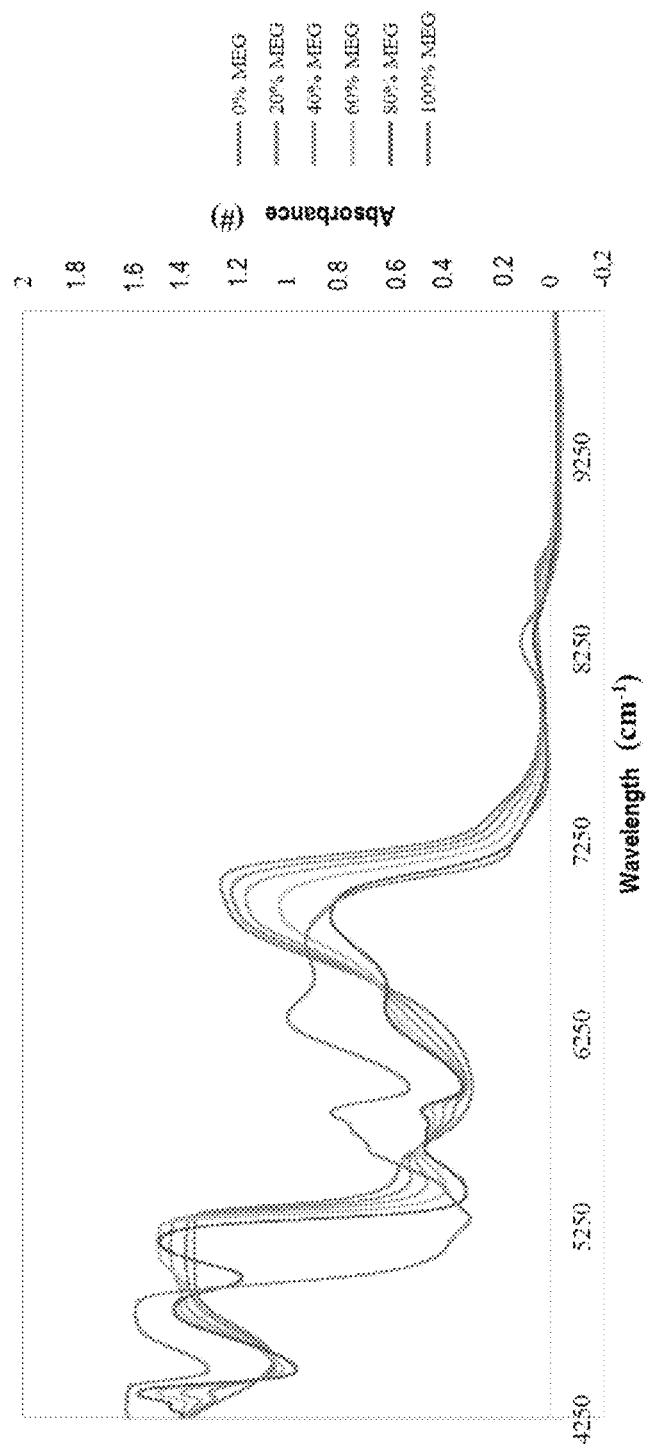
FIG. 2 shows the NIR spectra of the $H_2O$+MEG mixture in different solvent ratios (0 to 100% mass) and at room temperature.

FIG. 2 shows the NIR spectra for the different $H_2O$+MEG mixing ratios at room temperature. Spectra of pure solvents (water and MEG) were collected in order to evaluate the characteristic absorption bands of each solution, as well as to investigate the sensitivity of the NIR technique in different solvent concentrations. The wavelengths 5235, 5332, 6775, 6874, 7201, 7250, 8762, 8807, 9000 cm' correspond to the vibration of the OH functional group of water. The wavelengths 4700 and 7143 $cm^{-1}$ are related to the vibrations of the C—OH bonds of MEG. CH2 binds have characteristic vibrations at wavelengths 4300, 7200, 8333 $cm^{-1}$ while the wavelength 4545 $cm^{-1}$ corresponds to C—C binds. Observing the wavelength referring to the OH functional group of water, it is possible to notice that there is a variation in the intensity of this peak vibrations related to the presence of solvents. The water+glycol mixture has overlapping characteristics due to the presence of water and hydroxyl in this region.

Figure 3:
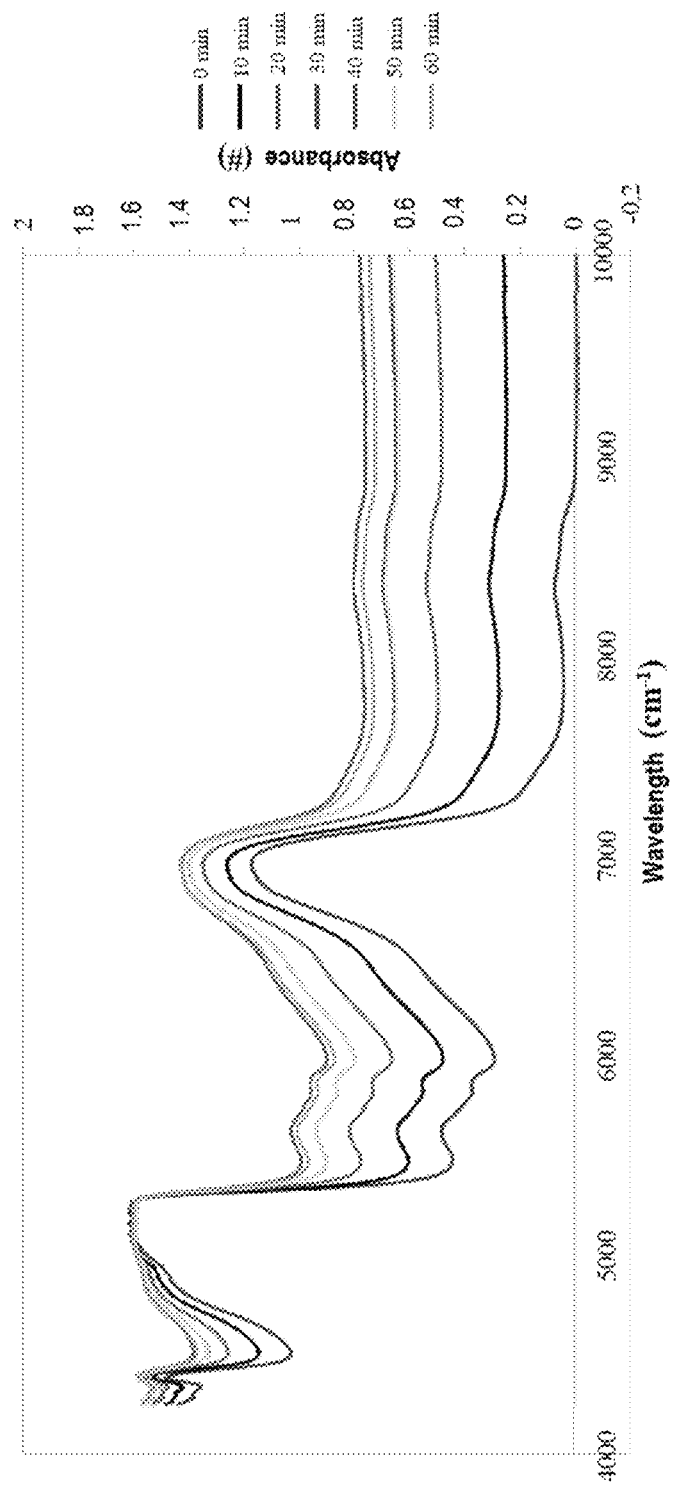
FIG. 3 presents the NIR spectra of $H_2O$+MEG solution containing carbonate salts (strontium and calcium) precipitated over time in the presence of NaCl and at a temperature of 60° C. using the NIR technique.

FIG. 3 shows, for example, the variation in the absorbance of the spectra obtained during the precipitation of $SrCO_3$ in aqueous solution with strontium ion concentration of 4200 ppm, and temperature of 60° C. These wavelengths, along with the data collected (spectra) for the other experimental conditions served as the basis for the chemometric treatment applied to experiments to monitor the kinetics of precipitation of salts in solvent mixtures. Once the vibrational regions of each concentration of MEG, water and MEG+water (in the presence of salts) were known, the variation of the spectra over time was then observed.

The experimental data referring to the size and number of precipitated particles provided by the FBRM (observed values) were used in the calibration of the data obtained with the NIR technique (predicted values). Artificial neural network models were built to obtain the amount and size of precipitated crystals in the solutions. Calibration consisted of using 3 experimental replicates of each condition investigated in the salt's precipitation ($SrCO_3$ or $CaCO_3$) obtained via FBRM at a temperature of 60° C., different water+MEG mixtures, in the absence and presence of NaCl. A fourth experimental replicate was considered external data to the validation set and was used to evaluate the predictive capacity of the model.

To adjust the neural model, aiming to determine the particle size, two predictive models were built, one being for the MEG-free system and the other for the systems containing 40% MEG. For all saline solutions in the absence of MEG, smoothing by Savitzky-Golay with a 2nd degree polynomial was used at every 3 points on the spectrum, as a pre-treatment, and then PCA was applied in the wavelength region from 4359-8473 $cm^{-1}$. Two principal components were used as input parameters along with the experimental observation time in order to describe the size of the formed crystals (ANN output parameter). Once the input and output parameters of the network were defined, the architecture of the ANN was evaluated through the RSME parameter, presented by Equation (1). Thus, the best neural network architecture for the description of the carbonate crystals growth kinetics in the absence of MEG was defined as 5-4-1 (5 input parameters, 4 neurons in the hidden layer and 1 output parameter). A 99.92% correlation between all data used in the model was achieved.

Figure 4:
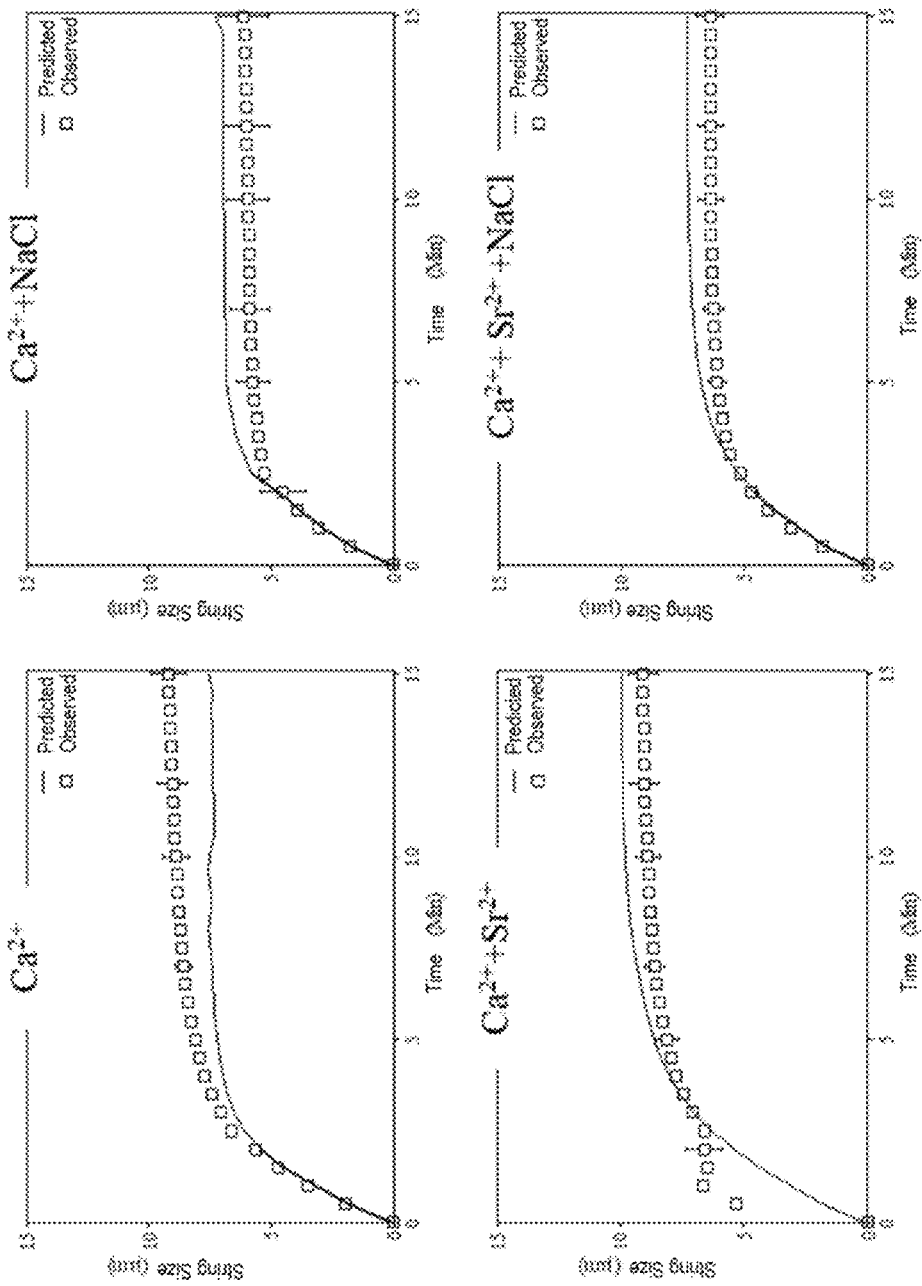
FIG. 4 presents the graphs related to the values predicted by the model obtained from the treatment of NIR spectra and values observed in the growth kinetics of carbonate salts in the absence and presence of NaCl, without addition of MEG and at a temperature of 60° C.

With the model calibrated and adjusted, external validation tests were performed in order to assess the predictive ability of the model. To do so, one experiment of each condition that was outside the calibration grid was used to obtain the external validation of the model. The data provided by the model were compared with the results obtained by the FBRM along with the experimental deviation. The result of this validation is shown in FIG. 4. It is possible to notice the good performance of the model, through the similarity between the curves that describe the salts precipitation kinetics behavior involved in the absence of MEG.

It is also observed in FIG. 4, the influence of the NaCl addition on the simultaneous precipitation of salts containing competing ions $Ca2+$ and/or $Sr2+$ with anion in common ($CO3-2$) investigated using the FBRM technique. This condition affected the growth kinetics of the salts present in the mixture. For example, for aqueous solutions containing ions $Ca2++Sr2+$ in the absence of NaCl, the final average particle size was found to be 11.1 □0.8 □m. While for mixtures in the presence of the NaCl electrolyte it was found that the final average particle size in aqueous solution was approximately 6.9 □0.3 □m.

Analogously to the procedure adopted for obtaining the model for obtaining particle size in the absence of the MEG solvent, the architecture of the neural network with a 4-3-1 structure was considered (4 input parameters, 3 neurons in the hidden layer and 1 output parameter) in the model construction for particle growth in the presence of MEG. The model developed and shown in FIG. 5 shows a good performance in monitoring the growth of carbonate particles in mixtures containing MEG solvent over time.

Figure 5:
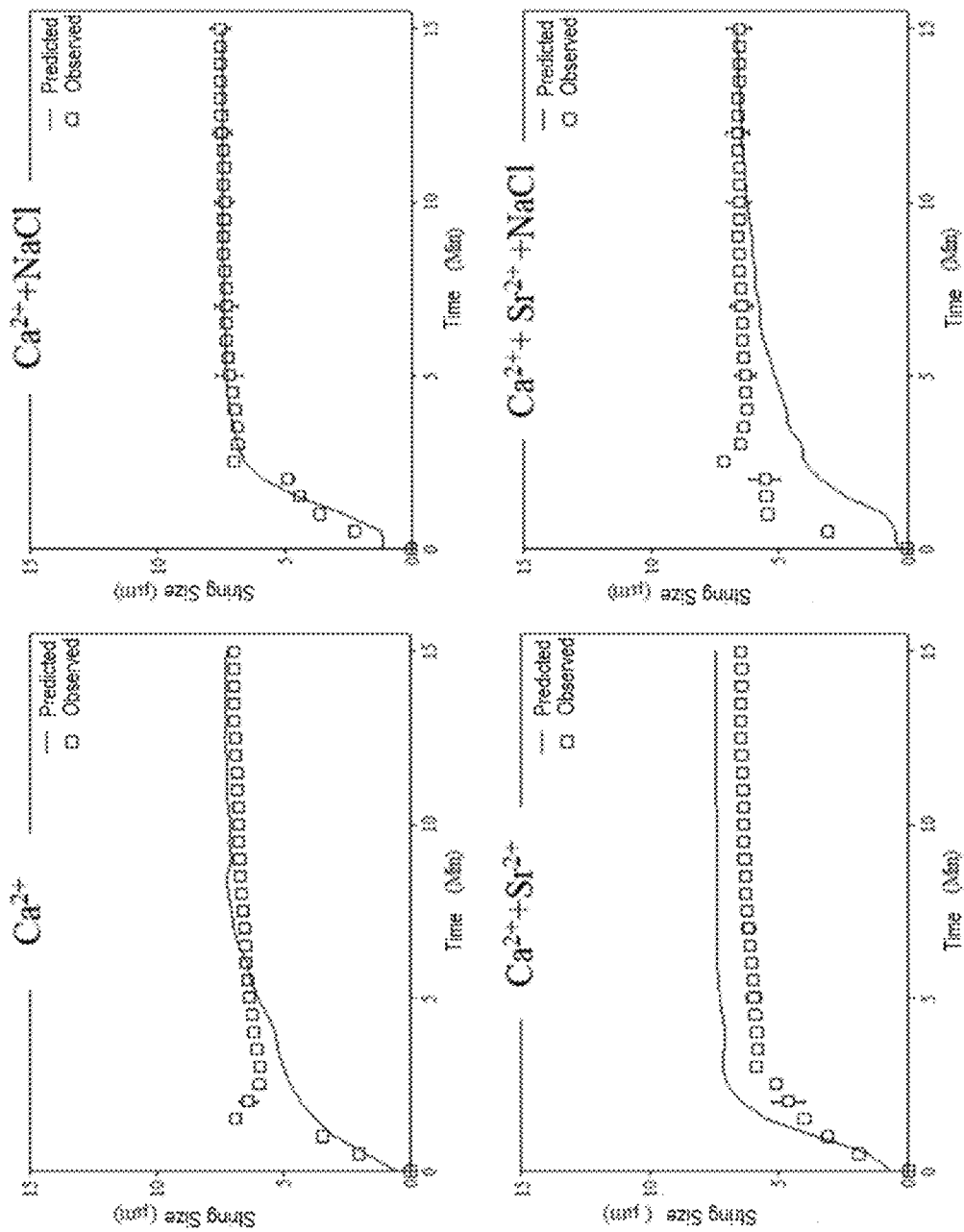
FIG. 5 presents the graphs related to the values predicted by the model generated from the treatment of NIR spectra and values observed in the growth kinetics of carbonate salts in the absence and presence of NaCl, with the addition of 40% m/m of MEG and in the temperature of 60° C.

Further considering FIG. 5, it is noted that the results presented by the FBRM technique disclose that the glycol present in the mixture also promoted a reduction in the size of the strings (particles) precipitated in the studied systems. Possibly the interactions between the OH functional group present in MEG and the precipitated salts hindered the growth and agglomeration of the formed crystals. The developed tool is perfectly capable of describing this effect, attesting to the robustness of the technique.

For the neural model fit aiming at monitoring the formation of particles, 2 predictive models were also built under the same conditions previously presented for the growth kinetics. In this case, Savitzky-Golay smoothing was used with a 2nd degree polynomial at every 3 points on the spectrum and then the PCA was applied in the region of 6400-7200 $cm^{-1}$. The architecture of the neural network used in the construction of the tracking model of particle formation in the absence of MEG was 4-5-1 (4 input parameters, 3 neurons in the hidden layer and 1 output parameter). The neural structure for obtaining the quantity of particles formed in systems in the presence of MEG was 4-4-1 (4 input parameters, 3 neurons in the hidden layer and 1 output parameter).

Figure 6:
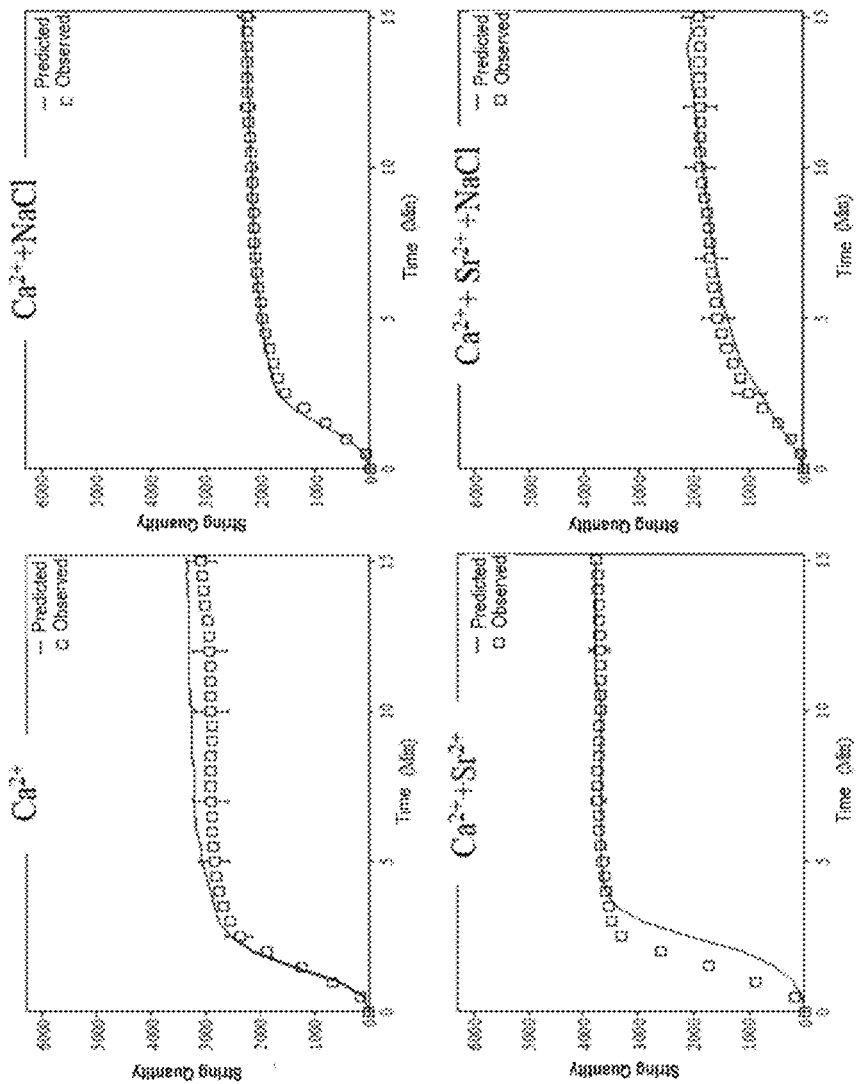
FIG. 6 presents the graphs relating to the values predicted by the model obtained from the treatment of NIR spectra and values observed in the formation kinetics of carbonate salts in the absence and presence of NaCl and without the addition of MEG and at a temperature of 60° C.
Figure 7:
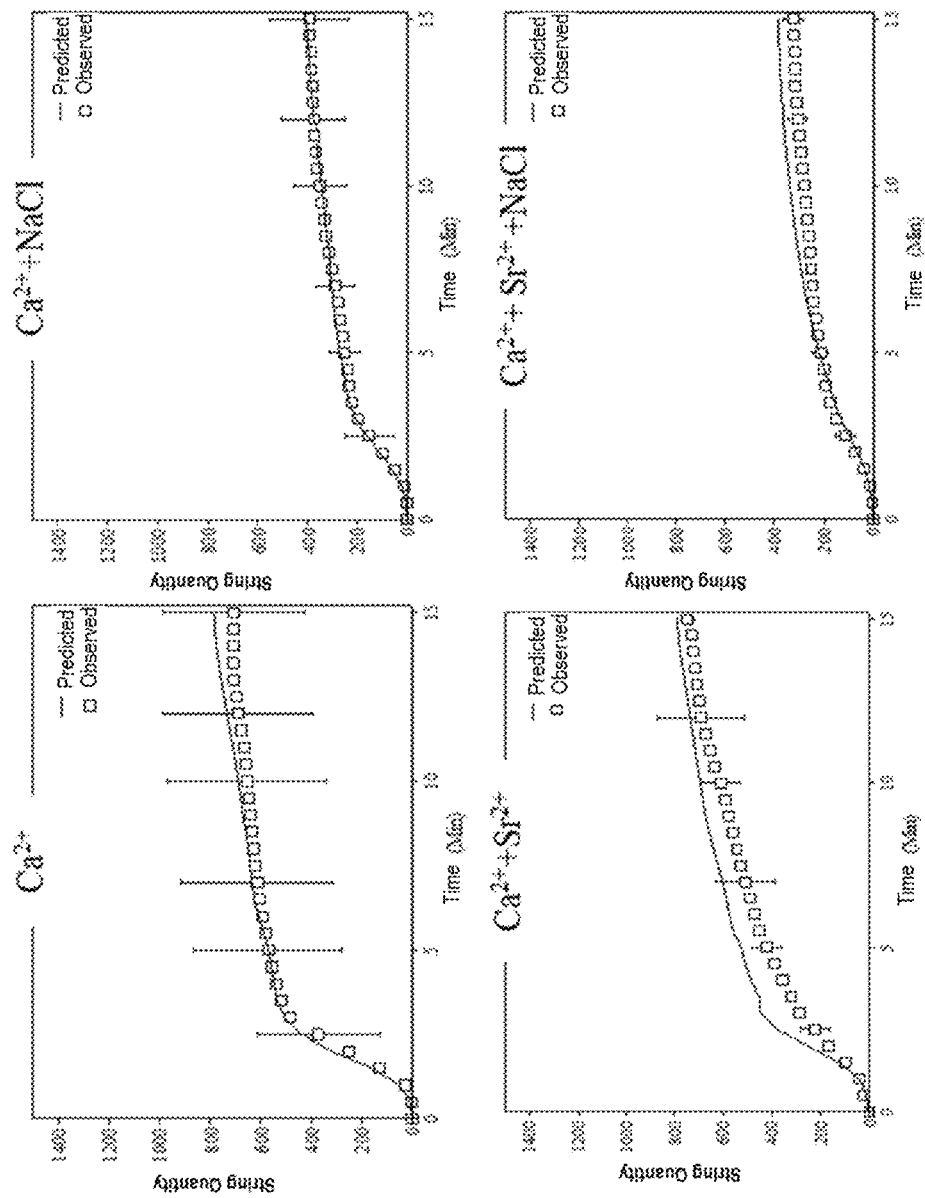
FIG. 7 presents the graphs related to the values predicted by the model generated from the treatment of NIR spectra and values observed in the formation kinetics of carbonate salts in the absence and presence of NaCl, with the addition of 40% m/m of MEG and in the temperature of 60° C.

FIG. 6 discloses the predictive capacity of the model developed to estimate the quantity of particles formed in solution in the absence of NaCl. In addition, the experimental result obtained through the FBRM technique is also observed. The quantity of formed particles is greater in systems containing only calcium or calcium+strontium ions, that is, the presence of NaCl increased the solubility of the salts present in the mixture. This behavior is related to the ionic strength of the solution. The greater the ionic strength of the medium, the lower the effective concentration (activity) of the ions present in the solution and consequently the greater the solubility of the salts. On the other hand, the glycol present in the mixture also reduced the number of strings (particles) precipitated in the investigated systems (FIG. 7).

The invention claimed is:

1. A method for monitoring the precipitation of inorganic salts in aqueous systems the method comprising:
    preparing the synthetic saline solutions;
    monitoring the salt precipitation;
    obtaining the experimental data;
    calibrating the mathematical models;
    wherein the method employs near infrared (NIR) and FBRM spectroscopy techniques.

2. The method, according to claim 1, wherein preparing the synthetic saline solutions comprises preparing the synthetic saline solutions from a mixture of aqueous solutions of anion and cation, in MEG solvent having mass ratios of 0 or 40% and temperature of 60° C.

3. The method of claim 1, wherein monitoring the salt precipitation comprises placing the synthetic saline solutions in a jacketed reactor with 600 mL, coupled to an ultrathermostatic water recirculation bath adjusted to a temperature of 60° C., a magnetic stirrer and a magnetic bar at a constant rotation of 1100 rpm, an monitoring the salt precipitation using an FBRM probe immersed in the aqueous solution, with an inclination of 45° in relation to the base of the reactor and a transflectance-type NIR probe with adjustable optical path, of 1 mm and a near infrared spectrophotometer.

4. The method of claim 1, wherein the experimental data comprises kinetics of carbonate and sulfate particle precipitation in a medium pressurized with CO2, in the range of 1 to 200 bar, at a temperature ranging from −30 to 200° C., preferably from 0 to 60° C., using the NIR technique.

5. The method claim 1, further comprising monitoring of the size distribution and particles quantity, through the strings size distribution data, using an FBRM technique.

6. The method of claim 1, further comprising collecting NIR spectra in the region of 4250 to 10000 cm-1 and each spectrum corresponds to 1 scan (scanning) with a duration of 2 seconds and a resolution of 8 cm-1.

7. The method of claim 1, wherein calibrating mathematical models comprises constructing models for monitoring the quantity and size of the particles precipitated in solution, employing a chemometric model based, on principal component analysis and neural networks using a hidden layer varying the number of neurons between 1 and 50 and using linear and hyperbolic tangent transfer functions.

* * * * *